Dec. 28, 1943.    F. CASHER ET AL    2,337,709
COATING APPARATUS
Filed Aug. 1, 1942    3 Sheets-Sheet 1
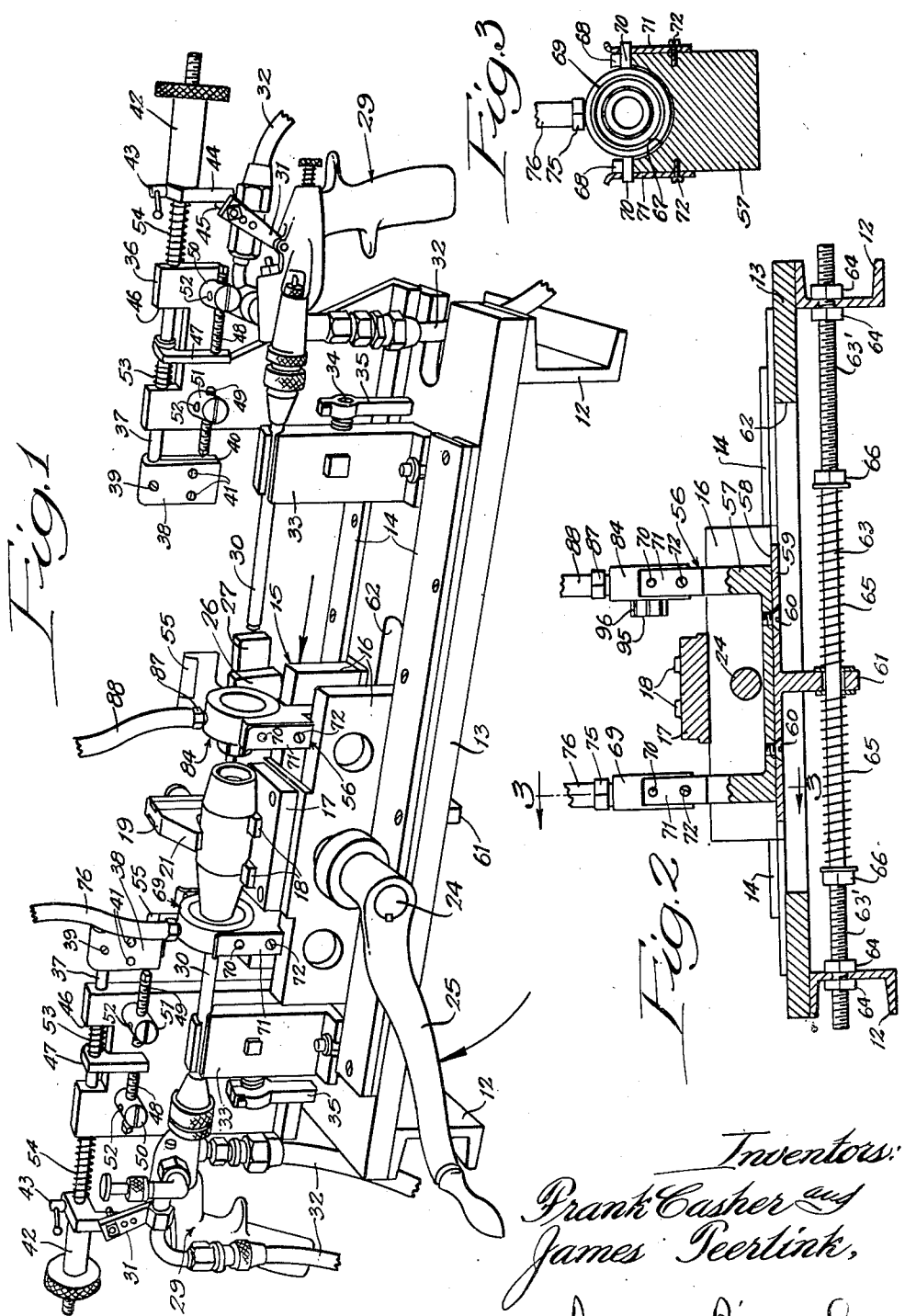
Inventors:
Frank Casher and
James Peerlink,
By Paul O. Pippel
Attorney.

Dec. 28, 1943.  F. CASHER ET AL  2,337,709
COATING APPARATUS
Filed Aug. 1, 1942  3 Sheets-Sheet 2
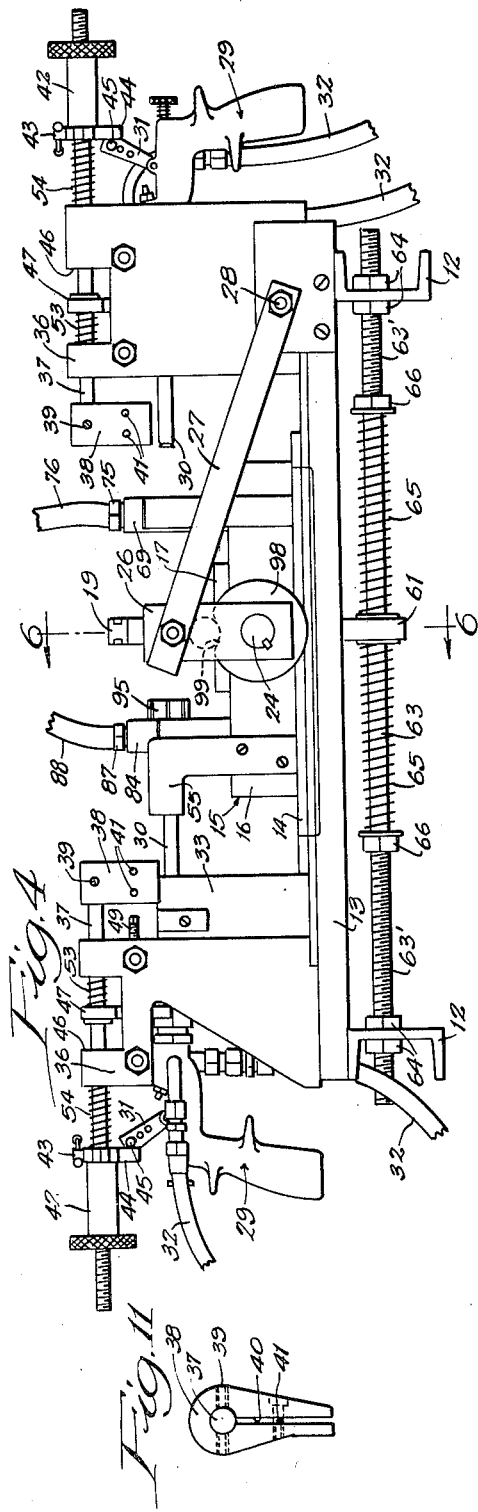
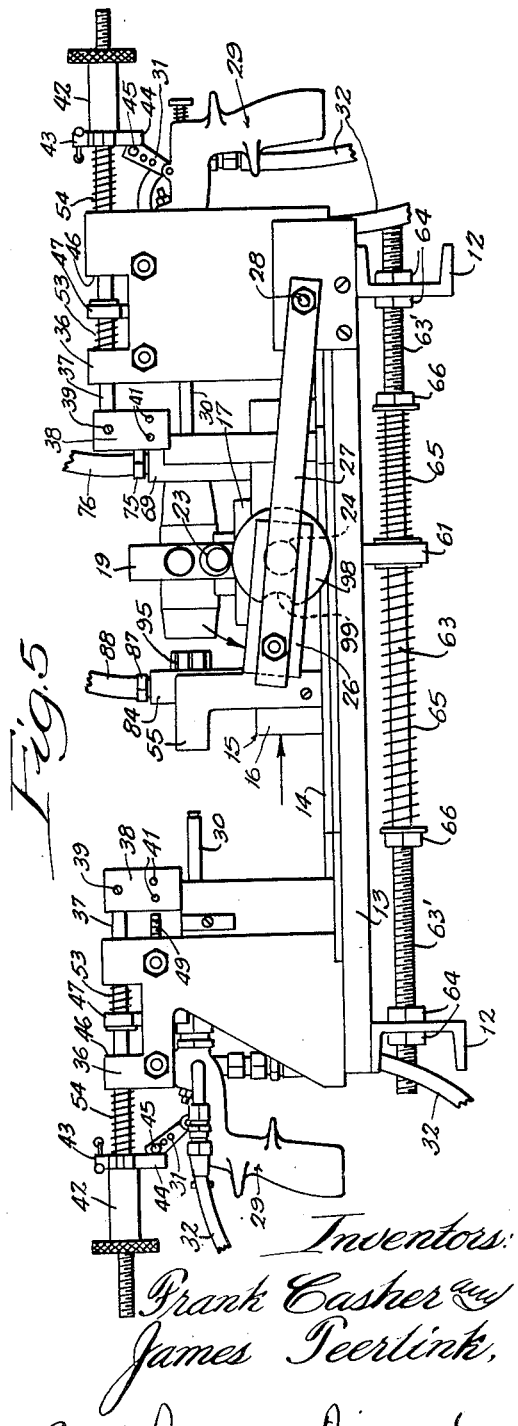
Inventors:
Frank Casher and
James Peerlink,
By Paul O. Pippel
Attorney.

Dec. 28, 1943.　　　F. CASHER ET AL　　　2,337,709
COATING APPARATUS
Filed Aug. 1, 1942　　　3 Sheets-Sheet 3
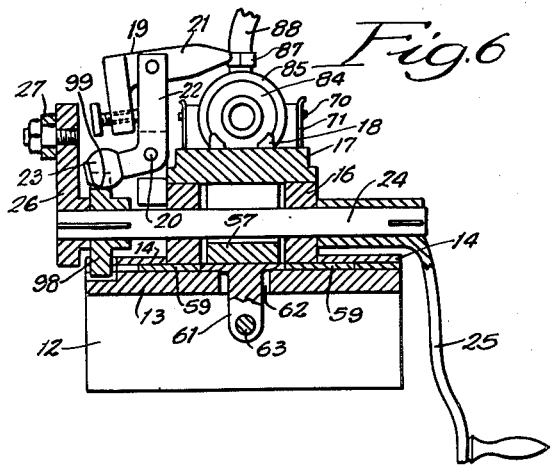
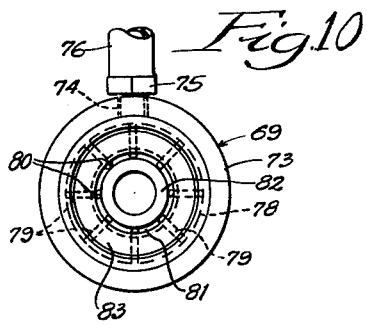
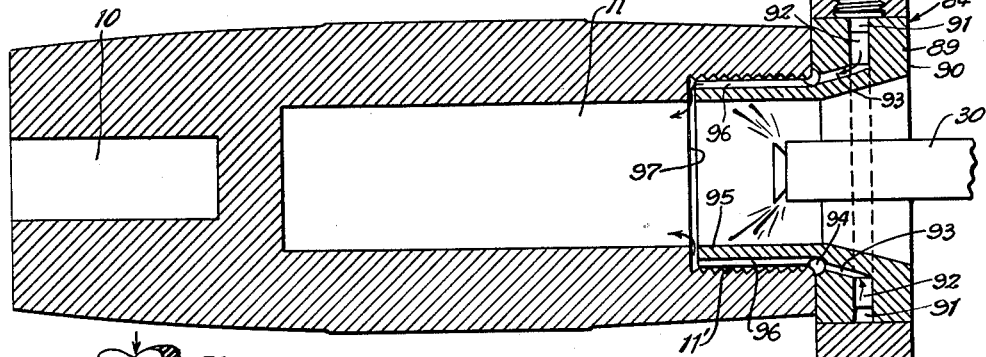
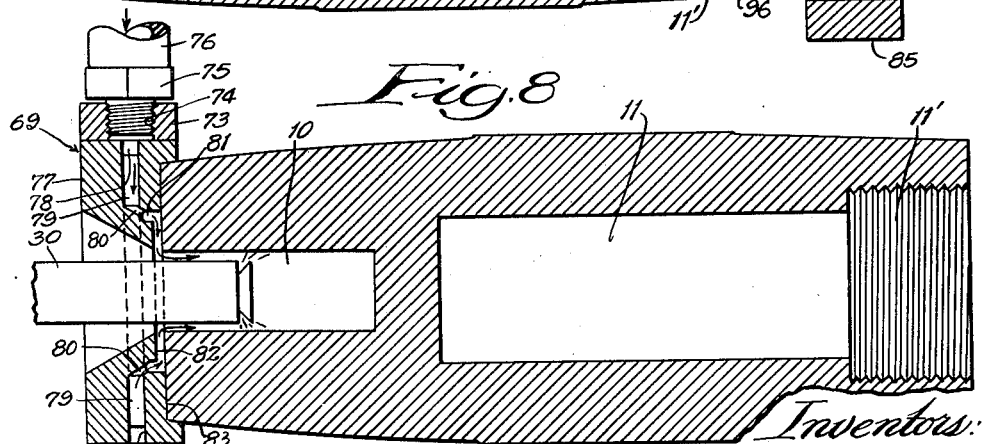
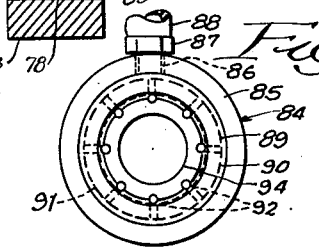
Inventors:
Frank Casher and
James Peerlink,
By Paul O. Pippel
Attorney.

Patented Dec. 28, 1943

2,337,709

UNITED STATES PATENT OFFICE 2,337,709

COATING APPARATUS

Frank Casher and James Teerlink, Chicago, Ill., assignors to International Harvester Company, a corporation of New Jersey Application August 1, 1942, Serial No. 453,184

11 Claims. (Cl. 91—45)

This invention relates to a coating apparatus. More specifically it relates to an apparatus for spraying recesses in the ends of a shell or similarly shaped object.

Certain types of shells which have recesses extending from each end require that the recesses be coated with paint. It is a tedious job to coat these recesses by hand, and, accordingly, it is desirable to devise some way in which the recesses may be coated by a machine.

An object of the present invention is to provide an improved coating apparatus.

A further object is to provide an improved apparatus for coating opposite ends of an object.

Another object is to provide an improved apparatus for supplying paint into the recesses in the opposite ends of the shell.

According to the present invention, a shell having recesses in its opposite ends is clamped in a holder which is moved between spaced spraying devices, first to one spraying device so that it extends into the recess in one end to spray that recess and then to the other spray device so that the nozzle thereof extends into the recess at the opposite end for spraying that recess.

In the drawings:

Figure 1 is a perspective view taken from the front of the improved spraying apparatus of the present invention;

Figure 2 is a vertical sectional view taken through a portion of the apparatus of the present invention;

Figure 3 is a sectional view taken on the line 3—3 of Figure 2;

Figure 4 is a view showing the rear of the spraying apparatus with the movable shell holder thereof in one position;

Figure 5 is a similar view of the spraying apparatus with the shell holder in a different position;

Figure 6 is a sectional view taken along the line 6—6 of Figure 4;

Figure 7 is a sectional view taken through the shell which is sprayed by the present apparatus and shows also in section an air ring applied to one end of the shell;

Figure 8 also shows the shell in section and shows a different type of air ring applied to the other end of the shell;

Figure 9 is an end view of the air ring shown in Figure 7;

Figure 10 is an end view of the air ring shown in Figure 8; and

Figure 11 is a detail view showing one of the elements of the improved apparatus of the present invention.

As shown in Figures 7 and 8, the shell which is to be sprayed by the apparatus of the present invention has a recess 10 of narrow bore extending for a short distance from one end, and a recess 11 of somewhat larger bore and of considerably greater depth extending from the other end. The outer end of the recess 11 is enlarged and threaded as indicated by the reference character 11'. The surfaces of the recesses 10 and 11 are to be coated by the novel apparatus which is now to be described.

The apparatus includes a support composed of a pair of spaced channel members 12, a flat, horizontal part 13 extending between them, and guide pieces 14 which extend along opposite sides of the part 13 so as to leave a space between them. Mounted upon the support between the guide pieces 14 is a holder 15 comprising upright blocks 16, a horizontal piece 17 extending between the upright blocks, and a clamping means comprising four spaced projections 18 up which the shell rests, and a clamping head 19 pivotally mounted at 20 upon the horizontal piece 17. The clamping head 19 includes a part 21 which actually contacts the upper part of the shell to hold it in the projections 18 and another part 22 which has a cam-follower portion 23. The holder for the shell is adapted to be reciprocated along the support by means which includes a rotatable shaft 24, a crank handle 25 secured thereto at the end of the shaft 24 at the front side of the apparatus, a crank arm 26 secured to the end of the shaft at the rear of the apparatus, and a connecting rod 27 connecting the end of the crank arm 26 and a point of the support indicated as 28. Turning of the crank handle 25 causes the holder to be moved back and forth along the support.

At each end of the support is positioned a spray device 29 which comprises a spray nozzle 30 and a releasing mechanism including an arm 31 extending upwardly. Connected to the spray device are hoses 32 for air and paint. The spray device 29 is supported upon the support by a clamp 33 which grips the spray nozzle 30. A screw 34, having a handle member 35 attached thereto, adjusts the clamp 33. A vertical plate 36 is secured at the rear side of one end of the support. A rod 37 is slidably mounted in the plate 36 and carries at its inner end a member 38 secured thereto by a set screw 39. The member 38 has a slot 40 through which extend screws 41 which control the size of the slot. The outer end of the rod 37 is threaded and carries a sleeve 42 which may be adjusted along the rod. The sleeve is fixed to the rod by a clamp 43. The sleeve carries a dependent projection 44 which engages a pin 45 projecting from the arm 31 of the plate device 29. The upper end of the plate 36 is slotted as indicated at 46, and the rod 37 extends through the slotted portion. An element 47 is secured to the rod at the part passing through the slotted portion 46 and depends therefrom so as to be between the ends of screws 48 and 49. These screws 48 and 49 are threaded into projections 50 and 51 extending from the plate 36. The screws 48 and 49 may be adjusted so as to regulate the space between their ends and to regulate the position of that space along the plate 36. Set screws 52 hold the screws 48 and 49 in any desired position. The rod 37 may slide with respect to the plate 36 to the extent permitted by the ends of the screws 48 and 49 which engage the element 47 and thereby limit the movement of the rod. Springs 53 and 54 mounted upon the rod and acting between the plate and the element 47 and the sleeve 42 urge the rod 37 to the right so that the element 47 engages the end of the screw 48.

Secured to each end of the rear side of one vertical block 16 of the holder 15 is a thin blade-like element 55. This element is directly in line with the slot 40 in the member 38 so that as the holder 15 is reciprocated along the support the blade-like element 55 passes into the slot. The dimensions of the element 55 and the slot 40 are such that, for example, the element at the right fits the slot at the right rather tightly, but the element cannot urge the rod 37 to the right since the screw 48 engaging the element 47 prevents such movement. However, when the holder 15 starts to move toward the left, the element 55, because of the tight fit with the slot 40, pulls the rod 37 to the left to the extent permitted by the screw 49. During this time, the projection 44 engaging the pin 45 on the arm 31 has caused the arm 31 to move to the left. This arm 31 forms part of the spray-releasing mechanism of the spray device 29, and the movement of the arm 31 to the left causes air and paint to be released in a spray through the end of the nozzle 30. The various parts mentioned in the present paragraph have been described as being fastened to the right end of the support as viewed in Figure 1. Similar parts are attached to the left end of the support, and they carry similar reference characters. They need not be described separately, since their operation is substantially the same as that of the parts at the right except that they operate when the holder 15 moves to the left end of the support.

As previously stated, the holder 15 includes spaced vertical blocks 16. In the space between these blocks a carrier 56 is mounted. This comprises a U-shaped part 57 having upwardly extending legs and a member 58 having a thin horizontal portion 59 secured by screws 60 to the base of the U-shaped part 57 and a depending projection 61 extending downwardly through an elongated slot 62 in the horizontal plate 13 of the support. A long rod 63 extends through the depending projection 61 and has threaded ends 63' extending through the channels 12 and secured thereto by nuts 64. Springs 65 are mounted upon the rod 63 at both sides of the depending projection 61 and are held between the projection 61 and nuts 66 upon the rod 63. It will be seen from the above description that the carrier 56 may be moved along the length of the horizontal plate 13 of the support but is yieldingly urged toward a central position on the support by means of the spring 65. As seen in Figure 3, the ends of the legs of the U-shaped part 57 are semicircular as indicated at 67 and slotted as indicated at 68 so that they receive an air ring 69 having pins 70 projecting through the slots 68. The air ring 69 is held in the upper end of the left leg of the U-shaped part 57 by sheet metal parts 71 that are secured to opposite sides of the left leg by means of screws 72 and have openings through which the ends of the pins 70 project. The upper ends of the sheet metal parts 71 are bent outwardly so that they facilitate the placing of the air ring 69 in the upper end of the leg, the pins engaging the bent ends of the sheet metal parts 71 to push them outwardly slightly so that the ends of the pins may enter the openings in the sheet metal parts. When this has happened, the parts 71 snap back into position to lock the air ring 69 in place. The air ring 69 is formed, as shown in Figure 8, of an outer ring 73 having a threaded opening 74 therein receiving a threaded fitting 75 connected to the end of an air hose 76. Secured within the outer ring 73 is a ring 77 having an outer annular groove 78 and spaced radial passages 79 extending inwardly therefrom. The inner ends of the radial passages 79 terminate in angular passages 80 extending into an annular groove 81 formed in one face of the ring 69. A portion of that face of the inner ring 77, inwardly of the annular groove 81, is depressed as indicated at 82. The face is also depressed outwardly of the annular groove as indicated at 83. The air ring 69 engages the end of the shell having the recess 10 as indicated in Figure 8. The depressed portion 83 of the inner ring 77 engages the outer portion of the end of the shell, and the inner portion of the end is spaced from the depressed part 82 of the end of the inner ring 77 so as to permit the passage of air therealong. Air under pressure passes through the hose 76 as indicated by the arrows, around the inner ring 77 by the passage of the annular groove 78 through the radial passageways 79 and 80, and through the space between the depressed portion 82 and the end of the shell toward the spray nozzle 30 which is within the recess 10. The air admitted in the space between the depressed parts 82 and the end of the shell serves to keep the end of the shell free from paint sprayed by the nozzle 30. The recess 11 in the opposite end of the shell has an enlarged threaded portion which is to be kept free of paint as well as the end of the shell. Thus, a different form of air ring 84 is required. This air ring 84 comprises an outer ring 85 similar to the outer ring 74 of the air ring 69. It has a threaded opening 86 therein receiving a threaded fitting 87 secured to an air hose 88. The air ring 84 also includes an inner member 89 having a portion 90 in the outer side of which is formed an annular groove 91, a plurality of radial passageways 92 extending inwardly from the annular groove 91, and angular passageways 93 extending from the inner ends of the radial passageways 92 into an annular groove 94 formed in the end of the portion 90. The inner part 89 also includes a sleeve-like extension 95 extending from the portion 90 and having a plurality of longitudinally extending grooves 96 formed at its outer side. The sleeve-like portion 95 is of a size to fit within the threaded enlargement 11' of the recess 11 in the shell, and when the portion 90 engages the end of the shell, the end of the sleeve-like extension 95 does not quite reach a shoulder 97 formed between the recess 11 and the threaded enlargement 11' thereof. Air is admitted through the hose 88 and the outer ring 85 to the annular groove 91 and thence through the passageways 92 and 93 to the annular groove 94 and thence along the grooves 96 and finally into the space between the shoulder 97 and the end of the sleeve-like extension 95. Thus, the end of the shell, the threaded enlargement 11', and the shoulder 97 are kept free of paint.

As seen in Figure 5, a cam 98 is secured to the shaft 24 at the rear end thereof adjacent the crank arm 26. The cam 98 is of circular shape except for a cut-out portion at one part thereof, indicated by the reference character 99 in Figures 4, 5, and 6. The cam-follower portion 23 of the clamping head 19 engages the cam 98 and in the position shown in Figures 4 and 6 rests in the cut-out portion 99. The clamping head 19 is so balanced that the cam-follower portion 23 will automatically fall into the cut-out portion 99 of the cam 98 so that the part 21 of the clamping head 19 is free of the shell as shown in Figure 6.

In operation of the spraying apparatus of the present invention, the cut-out portion 99 of the cam 98 is at the top when the holder 15 is in a mid-position on the support. In this position the clamping head 19 is tilted back as shown, and the operator places a shell, the recesses of which are to be coated, upon the holder 15. Rotation of the shaft 24 by the crank handle 25 causes the cut-out portion 99 to be rotated away from the cam-follower portion 23 so that the periphery of the cam 98 engages the cam portion 23 and pivots the clamping head 19 into clamping engagement with the shell. Clockwise rotation of the crank handle 25 causes the holder 15 to move to the left as viewed in Figure 1 and to the right as viewed in Figure 5 by virtue of the connection of the shaft with the crank arm 26 and the connection of the crank arm 26 with the support by means of the connecting rod 27. As the holder 15 and the shell mounted thereon move toward the right, as viewed in Figure 5, the end of the shell having the recess 10 is brought into engagement with the air ring 69 as viewed in Figure 8, and the shell is moved sufficiently so that the recess 10 therein receives the end of the nozzle 30. In the meantime the blade-like element 55 has passed into the recess 40 in the part 38 secured to the rod 37. The rod 37 cannot be moved to the right as viewed in Figure 5, since the dependent part 47 engages the screw 48. During this time, no paint is released from the nozzle 30, but as soon as the shell commences to move away from the nozzle 30, paint is released from the nozzle, because the tight grip of the recess 40 upon the blade-like element 55 causes the rod 37 to move and therewith the projection 44 engaging the bolt 45 on the arm 31 of the spray releasing mechanism, and the arm 31 is moved to release paint from the nozzle. This takes place as the nozzle 30 is moving away from the shell, but is limited to the time during which the nozzle is still within the recess 10, for when the rod 37 has been moved sufficiently the projecting member 47 engages the end of the screw 49 and thereupon the blade-like element 55 is pulled free of the recess 40 in the member 38. When this happens, the springs 53 and 54 move the rod 37 back to its original position, and the arm 31 of the spray releasing mechanism is also moved back to its original closed position. Continued rotation of the shaft 24 by the crank handle 25 moves the holder 15 to the right, as viewed in Figure 1, to bring the right end of the shell to the spray device 29 at the right. The right end of the shell engages the air ring 84 as shown in Figure 7, and the recess 11 admits the spray nozzle 30 within it. During the movement of the shell toward the right-hand spray device, no paint is sprayed, but as soon as the shell starts to move away from the right-hand end of the support and from the right-hand spray device, the right-hand blade-like element 55 will pull the right-hand rod with it. This, as previously described, causes the arm 31 of the spray releasing mechanism to release paint sprayed from the spraying nozzle 30. By the time that the spray nozzle 30 has passed out of the recess 11, the spraying of paint is stopped, for by that time the set screw 49 engages the downwardly projecting member 47 in the rod 37 and causes the element 55 to be freed from the member 38, and the rod 37 will be returned to its original position under the action of the springs 53 and 54 so that the spray releasing mechanism will be closed. As the holder 15 is moved toward its central position, the cam 98 is rotated sufficiently for the cut-out portion 99 to be brought to the top to allow the clamping head 19 to fall back to the position of Figures 4 and 6, in which position the sprayed shell may be removed and a new shell put in its place. Since the air rings 69 and 84 are mounted upon the carrier 56, which is urged toward a central position by the springs 65 positioned upon the rod 63, the links will be free of the shell when the holder and shell are in the central position in which position the shell is removed.

It will be apparent from the foregoing description that a new and novel coating apparatus has been devised. By this apparatus the opposite ends of an object are coated and more specifically recesses in the ends of a shell or similar piece are sprayed with paint. The essential feature of the invention is the moving of the object to be coated between its spray devices so that one object is brought into adjacency with one spray device and also into adjacency with the other spray device. The arrangement of parts is such that coating material is applied to the ends of the object only during the time when an end of the object is adjacent the coating device. More particularly the coating material is applied during the initial movement of the end of the object away from immediate adjacency with the coating device. More specifically, recesses in the ends of a shell are painted, and the shell is moved toward a spray nozzle to the extent that the spray nozzle extends into the recesses. The ends of the shell are kept free of the material sprayed by air rings which engage the ends of the shell during the time that the spray nozzles extend within the ends of the shell. These air rings admit a stream of air along the ends of the shell so as to keep the ends free of coated material. The air rings are mounted upon a carrier which is resiliently urged toward a central position so that in the central position of the shell to which it is removed from the holder, the air rings are free of the shell and do not obstruct its removal from its holder.

The intention is to limit the invention only within the scope of the appended claims.

What is claimed is:

1. An apparatus for spraying recessed ends of a shell, comprising a support, a pair of spray nozzles spaced from one another, means mounting the spray nozzles on the support, a holder for the shell, means for reciprocating the holder along the support to bring the one recessed end of the shell over one nozzle and thereafter the other recessed end of the shell over the other nozzle, means for causing spray to be delivered from the said one nozzle into the said one recessed end of the shell while over the said one nozzle, and means for causing spray to be delivered from the said other nozzle into the said other recessed end of the shell while over the said other nozzle.

2. An apparatus for spraying the recessed ends of a shell, comprising a pair of spray devices spaced from one another and each including a spray nozzle and a spray-releasing means, means for reciprocating the shell to bring one recessed end thereof over one nozzle and thereafter the other recessed end over the other nozzle, means associated with the shell-reciprocating means for actuating the spray-releasing means of the said one nozzle to release spray therefrom into the said one recessed end of the shell while over the said one nozzle, and means associated with the reciprocating means for actuating the spray-releasing means of the said other nozzle to release spray therefrom into the said other recessed end of the shell while over the said other nozzle.

3. An apparatus for coating the ends of an object, comprising a pair of coating devices spaced from one another and each including a release mechanism, means for reciprocating the object to bring one end thereof into immediate adjacency with one coating device and thereafter to bring the other end into immediate adjacency with the other coating device, means associated with the object-reciprocating means for actuating the release mechanism of the said one coating device to coat the said one end of the object upon arrival of the same into immediate adjacency with the said one coating device, and means associated with the object-reciprocating means for actuating the release mechanism of the said other coating device to coat the said other end of the object upon arrival of the same into immediate adjacency with the said other coating device.

4. An apparatus for coating the ends of an object, comprising a pair of coating devices spaced from one another and each including a release mechanism, means for reciprocating the object to bring one end thereof into immediate adjacency with one coating device and thereafter to bring the other end into immediate adjacency with the other coating device, means reciprocable with the object-reciprocating means for actuating the release mechanism of one coating device to coat one end of the object upon arrival thereof into immediate adjacency with the said one coating device, and means reciprocable with the object-reciprocating means for actuating the release mechanism of the other coating device to coat the other end of the object upon arrival thereof into immediate adjacency with the said other coating device.

5. An apparatus for spraying a pair of recesses in the ends of an object, comprising a pair of spray devices spaced from one another and each including a spray nozzle and a spray-releasing means, means for reciprocating the object between the spray devices to cause one recess in the object to surround one nozzle during movement of the object toward the said one nozzle and also during movement of the object away from the said one nozzle and thereafter to cause the other recess to surround the other nozzle during movement of the object toward the said other nozzle and also during movement of the object away from the said other nozzle, means associated with the object-reciprocating means for actuating the spray-releasing means of the said one nozzle to cause the said one nozzle to spray the said one recess while surrounded by the recess during movement of the object away from the said one nozzle, and means associated with the object-reciprocating means for actuating the spray-releasing means of the said other nozzle to cause the said other nozzle to spray said other recess while surrounded by the said other recess during movement of the object away from the said other nozzle.

6. An apparatus for spraying a pair of recesses in the ends of an object, comprising a support, a pair of spray devices mounted upon the support in spaced relation to one another and each including a nozzle, a spray-releasing means, an element slidable on the support in a direction toward the other spray device so as to actuate the spray-releasing means by movement in the direction toward the other spray device, a member secured to the element and having a narrow recess therein, means for reciprocating the object between the spray devices to cause one recess in the object to surround one nozzle during movement of the object toward the said one nozzle and also during movement of the object away from the said one nozzle and thereafter to cause the other recess to surround the other nozzle during movement of the object toward the said other nozzle and also during movement of the object away from the said other nozzle, a pair of thin, blade-like elements secured to opposite ends of the object-reciprocating means, each adapted to pass into the narrow recess in a member at the end of movement of the object toward one spray nozzle and to move by frictional grip with the recess the member and the element in a direction toward the other spray device during movement of the object away from the one spray nozzle, whereby the recesses in the object are sprayed while surrounding the nozzles during movement of the object away from the nozzles.

7. An apparatus for spraying the ends of an object, comprising a support, a pair of spray devices mounted upon the support in spaced relation to one another, a holder for the object including a releasable clamping head, a shaft rotatably mounted on the holder, a rotatable cam coacting with the clamping head to hold the object clamped to the holder for all but a small part of the rotation of the cam, means securing cam, crank, and handle to the shaft, a connecting rod connecting the crank to the support for causing rotation of the shaft by means of the handle to make the holder reciprocate to bring one end of the object into adjacency with one spray device and thereafter the other end of the object into adjacency with the other spray device and to hold the object clamped in the holder by the clamping in all but a certain small part of the reciprocation of the holder between the spray devices, and means reciprocable with the holder for causing each spray device to spray an end of the object while the object is adjacent the spray device.

8. An apparatus for spraying a pair of recesses in opposite ends of an object, comprising a support, a pair of spray devices mounted upon the support in spaced relation to one another and each comprising a nozzle and a spray-releasing means, a holder mounted upon the support for reciprocation between the spray devices to bring the one recess over one spray nozzle and thereafter the other recess over the other spray nozzle, means reciprocable with the holder for actuating the spray-releasing means of the said one spray nozzle to make the said one spray nozzle spray the said one recess while surrounded by the said one recess, means reciprocable with the holder for actuating the spray-releasing means of the said other spray nozzle to make the said other spray nozzle spray the said other recess while surrounded by the said other recess, a carrier reciprocably mounted upon the support, resilient means urging the carrier toward a central position between the spray devices, air rings mounted upon opposite ends of the carrier so as to fit successively against the ends of the object as the recesses receive the nozzles and to supply air to the ends of the object to keep them free of spray.

9. An apparatus for spraying a pair of recesses of considerable depth in the ends of an object, comprising a support, a pair of spray devices fixed thereto in spaced relation to one another and each including a spray nozzle and a spray-releasing means, a holder for the shell mounted upon the support to reciprocate the object between the spray devices to cause one recess in the object to surround one nozzle during movement of the object toward the said one nozzle and also during movement of the object away from the said one nozzle and thereafter to cause the other recess to surround the other nozzle during movement of the object toward the said other nozzle and also during movement of the object away from the said other nozzle, means reciprocable with the object holder for actuating the spray-releasing means of the said one nozzle to cause the said one nozzle to spray the said one recess while surrounded by the recess during movement of the object away from the said one nozzle, means reciprocable with the object holder for actuating the spray-releasing means of the said other nozzle to cause the said other nozzle to spray the said other recess while surrounded by the said other recess during movement of the object away from the said other nozzle, a carrier reciprocably mounted upon the support, resilient means urging the carrier toward a central position between the spray devices, air rings mounted upon opposite ends of the carrier so as to fit successively against the ends of the object as the recesses receive the nozzles and to supply air to the ends of the object to keep them free of spray.

10. An apparatus for spraying the ends of an object comprising a support, a pair of spray devices secured to the support in spaced relationship to one another and each including a mechanism for releasing spray, a holder for the object, means for reciprocating the holder to bring one end of the object into immediate adjacency with one spray device and thereafter to bring the other end of the object into immediate adjacency with the other spray device, means reciprocable with the holder and adapted to actuate the releasing mechanism of each spray device to spray the end of the object immediately upon movement of the end away from the point of most immediate adjacency with the spray device.

11. An apparatus for spraying a pair of recesses of considerable depth in the ends of an object, comprising a pair of spray devices spaced from one another and each including a spray nozzle and a spray-releasing means, means for reciprocating the object between the spray devices to cause one recess in the object to surround one nozzle during movement of the object toward the said one nozzle and also during movement of the object away from the said one nozzle and thereafter to cause the other recess to surround the other nozzle during movement of the object toward the said other nozzle and also during movement of the object away from the said other nozzle, a pair of elements, one connected to the holder and the other connected to the spray-releasing means of the said one spray device, one element sliding tightly into a recess in the other element upon movement of the said one recess in the object over the said one spray nozzle and pulling the other element by frictional grip with the recess therein to release the spraying means to cause the said one nozzle to spray the said one recess while surrounded by the recess during movement of the object away from the said one nozzle, and a second pair of elements, one connected to the holder and the other connected to the spray-releasing means of the said other spray device, one element sliding tightly into a recess in the other element upon movement of the said other recess in the object over the said other spray nozzle and pulling the other element by frictional grip with the recess therein to release the spraying means to cause the said other nozzle to spray the said other recess while surrounded by the recess during movement of the object away from the said other nozzle.

FRANK CASHER.
JAMES TEERLINK.